(12) United States Patent
Cahill (10) Patent No.: US 11,704,502 B2
(45) Date of Patent: Jul. 18, 2023

(54) TWO WAY COMMUNICATION ASSEMBLY

(71) Applicant: Karen Cahill, Laurel Springs, NJ (US)

(72) Inventor: Karen Cahill, Laurel Springs, NJ (US)

( * ) Notice: Subject to any disclaimer, the term of this patent is extended or adjusted under 35 U.S.C. 154(b) by 49 days.

(21) Appl. No.: 17/382,056

(22) Filed: Jul. 21, 2021

(65) Prior Publication Data

US 2023/0029271 A1 Jan. 26, 2023

(51) Int. Cl.
*G06F 40/42* (2020.01)
*G06F 3/04886* (2022.01)
*G06F 40/58* (2020.01)
*G06F 40/55* (2020.01)

(52) U.S. Cl.
CPC .......... *G06F 40/42* (2020.01); *G06F 3/04886* (2013.01); *G06F 40/55* (2020.01); *G06F 40/58* (2020.01)

(58) Field of Classification Search
CPC .......... G06F 40/40; G06F 40/42; G06F 40/44; G06F 40/45; G06F 40/47; G06F 40/49; G06F 40/55; G06F 40/56; G06F 40/58; G06F 3/04886
See application file for complete search history.

(56) References Cited

U.S. PATENT DOCUMENTS

| | | | |
|---|---|---|---|
| 5,900,848 A * | 5/1999 | Haneda | G06F 1/1643 361/679.04 |
| 6,993,474 B2 | 1/2006 | Curry | |
| 8,275,602 B2 | 9/2012 | Curry | |
| D691,146 S | 10/2013 | Perez | |
| 9,501,472 B2 | 11/2016 | Manuselis | |
| 10,061,771 B1 * | 8/2018 | Zhang | G06F 40/58 |
| D952,619 S * | 5/2022 | Kim | D14/239 |
| 2002/0173965 A1 * | 11/2002 | Curry | G06F 40/58 704/275 |
| 2006/0271370 A1 | 11/2006 | Li | |
| 2007/0239424 A1 * | 10/2007 | Payn | G09B 19/08 704/3 |
| 2008/0101634 A1 * | 5/2008 | Burger | H04R 25/505 381/312 |
| 2008/0218950 A1 * | 9/2008 | Morrison | H04M 1/236 361/679.56 |
| 2009/0159762 A1 * | 6/2009 | Chinuki | F16M 11/42 248/158 |
| 2012/0035906 A1 * | 2/2012 | Jephcott | A61B 5/7465 704/2 |

(Continued)

FOREIGN PATENT DOCUMENTS

GB 1577255 A * 10/1980 ......... G06F 17/2735
WO WO2012166282 12/2012

*Primary Examiner* — Daniel Samwel (57) ABSTRACT

A two way communication assembly includes a display housing that is positionable on a support surface such that the display housing is visible to a pair of users. A pair of displays and a pair of qwerty keyboards is each integrated into opposite sides of the display housing. A translation unit is integrated into the display housing and the translation unit stores a database comprising a plurality of languages spoken around the world. The translation unit translates language between the qwerty keyboards to facilitate a patient who speaks a first language to communicate with a caregiver that speaks a second language. In this way the translation unit facilitates the caregiver to communicate with the patient.

6 Claims, 5 Drawing Sheets

(56) References Cited

U.S. PATENT DOCUMENTS

| | | | |
|---|---|---|---|
| 2012/0245920 A1* | 9/2012 | Wu | G06F 40/58 |
| | | | 704/E11.001 |
| 2012/0310622 A1 | 12/2012 | Zivkovic | |
| 2013/0297287 A1 | 11/2013 | Yiu | |
| 2015/0001870 A1* | 1/2015 | Parcher | B60K 37/06 |
| | | | 296/1.07 |
| 2017/0053652 A1* | 2/2017 | Choi | G10L 15/16 |
| 2019/0251344 A1* | 8/2019 | Menefee | G06T 7/20 |
| 2020/0228895 A1* | 7/2020 | Ryle | H04R 29/004 |

\* cited by examiner

TWO WAY COMMUNICATION ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to communication devices and more particularly pertains to a new communication device for translating languages between a caregiver and a patient. The device includes a housing that is vertically oriented on a support surface for viewing by the caregiver and the patient. A pair of qwerty keyboards and a pair of displays is each positioned on opposite sides of the display housing. Additionally, a translation unit translates languages between the qwerty keyboards such that the displays display words in the language spoken by each of the caregiver and the patient to facilitate the caregiver and the patient to communicate without a translator.

(2) Description of Related Art Including Information Disclosed Under 37 CFR 1.97 and 1.98

The prior art relates to communication devices including a variety of double sided laptop computers, each oriented on a horizontal plane, for translating languages between a pair of users. The prior art discloses a variety of voice translators that translate spoken language from one person into an outputted audible language of another person. In no instance does the prior art disclose a translation device that includes a pair of displays and a pair of qwerty keyboards that are oriented on a vertical plane for translating languages and which includes verbal translation functions.

BRIEF SUMMARY OF THE INVENTION

An embodiment of the disclosure meets the needs presented above by generally comprising a display housing that is positionable on a support surface such that the display housing is visible to a pair of users. A pair of displays and a pair of qwerty keyboards is each integrated into opposite sides of the display housing. A translation unit is integrated into the display housing and the translation unit stores a database comprising a plurality of languages spoken around the world. The translation unit translates language between the qwerty keyboards to facilitate a patient who speaks a first language to communicate with a caregiver that speaks a second language. In this way the translation unit facilitates the caregiver to communicate with the patient.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 5 thereof, a new communication device embodying the principles and concepts of an embodiment of the disclosure and generally designated by the reference numeral 10 will be described.

As best illustrated in FIGS. 1 through 5, the two way communication assembly 10 generally comprises a display housing 12 that is positionable on a support surface 14 such that the display housing 12 visible to a pair of users 16. The users 16 may be a caregiver in a hospital setting and a patient that is receiving care. The caregiver and the patient may be people that speak different languages from each other and are not able to verbally communicate without an interpreter. The display housing 12 has a pair of displays 18 each being integrated into opposite sides of the display housing 12 such that each of the displays 18 is visible to a respective one of the users 16. Each of the displays 18 may comprise a liquid crystal display or other type of electronic display that can display images and words.

The display housing 12 has a front surface 20, a back surface 22 and a perimeter surface 24 extending between the front surface 20 and the back surface 22, and each of the displays 18 is positioned on a respective one of the front surface 20 and the back surface 22. The perimeter surface 24 has a bottom side 26, a first lateral side 28 and a second lateral side 30. A plurality of feet 32 is each coupled to the display housing 12 and the plurality of feet 32 support the display housing 12 on a support surface 14 having the display housing 12 being vertically oriented. In this way the display housing 12 is visible to the caregiver and the patient.

Each of the feet 32 extends downwardly from the bottom side 26 of the perimeter surface 24 of the display housing 12. Additionally, each of the feet 32 is oriented at a substantially diagonal angle with a respective one of the front surface 20 and the back surface 22 of the display housing 12. Each of the feet 32 is positioned adjacent to a respective one of the first lateral side 28 and the second lateral side 30 of the perimeter surface 24 of the display housing 12. As is most clearly shown in FIG. 1, a pair of curved members 34 may be provided, each having a channel 36 integrated therein for insertably receiving the perimeter surface 24 of the display housing 12. Each of the curved members 34 may be positioned on an intersection between the bottom side 26 and a respective one of the first lateral side 28 and the second lateral side 30. Additionally, each of the feet 32 may be attached to a respective one of the curved members 34.

A pair of qwerty keyboards 38 is provided and each of the qwerty keyboards 38 is integrated into opposite sides of the display housing 12. In this way each of the qwerty keyboards 38 is accessible to a respective one of the users 16 thereby facilitating each of the users 16 to type with a respective one of the qwerty keyboards 38. Each of the qwerty keyboards 38 is in communication with a respective one of the displays 18 and each of the displays 18 is capable of displaying indicia comprising words typed by the respective qwerty keyboard 38. Each of the qwerty keyboards 38 is positioned on a respective one of the front surface 20 and the back surface 22 of the display housing 12. Additionally, each of the qwerty keyboards 38 is positioned between the bottom side 26 of the perimeter surface 24 of the display housing 12 and the respective display 18.

Figure 1:
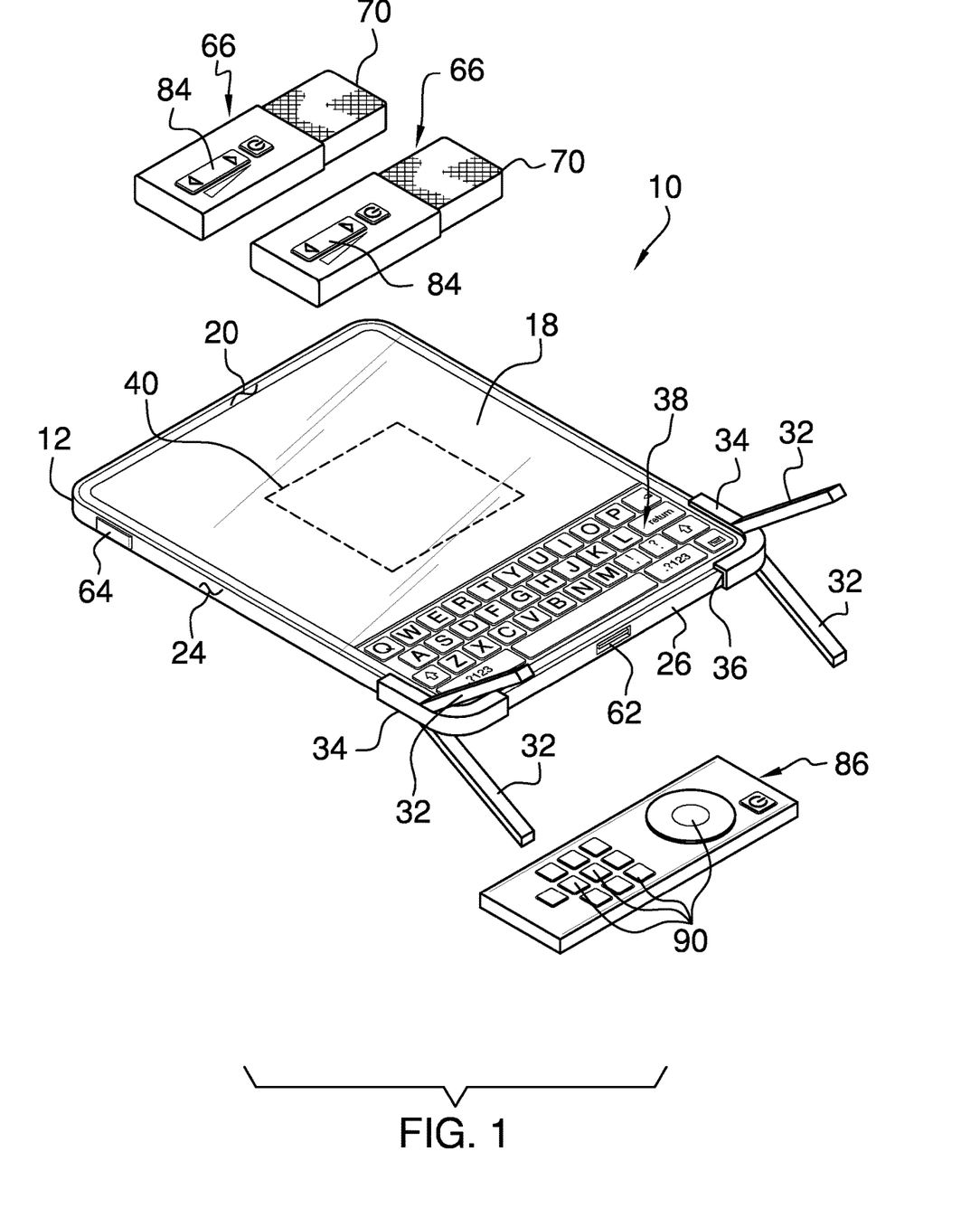
FIG. 1 is a perspective view of a two way communication assembly according to an embodiment of the disclosure.
Figure 2:
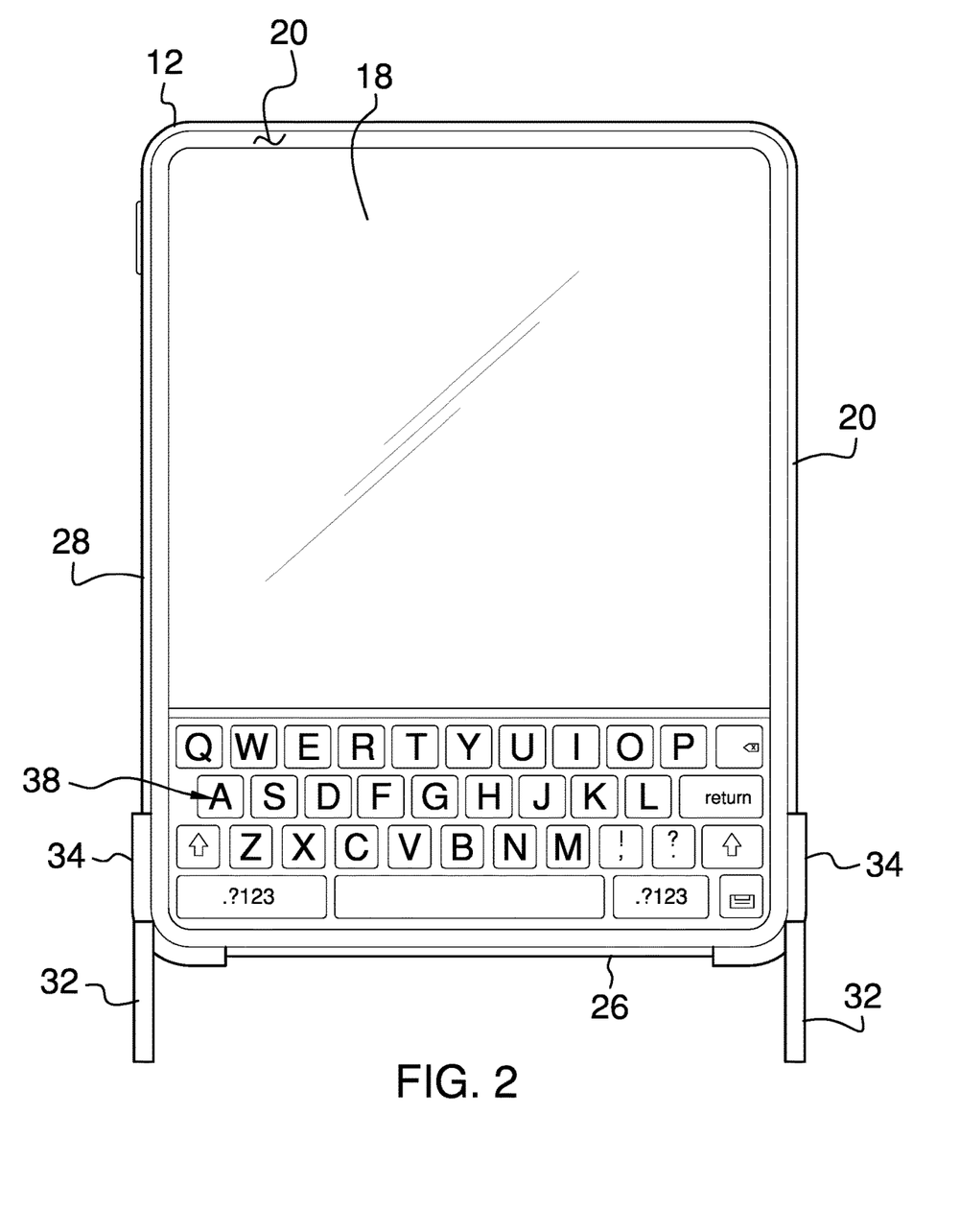
FIG. 2 is a front view of an embodiment of the disclosure.
Figure 3:
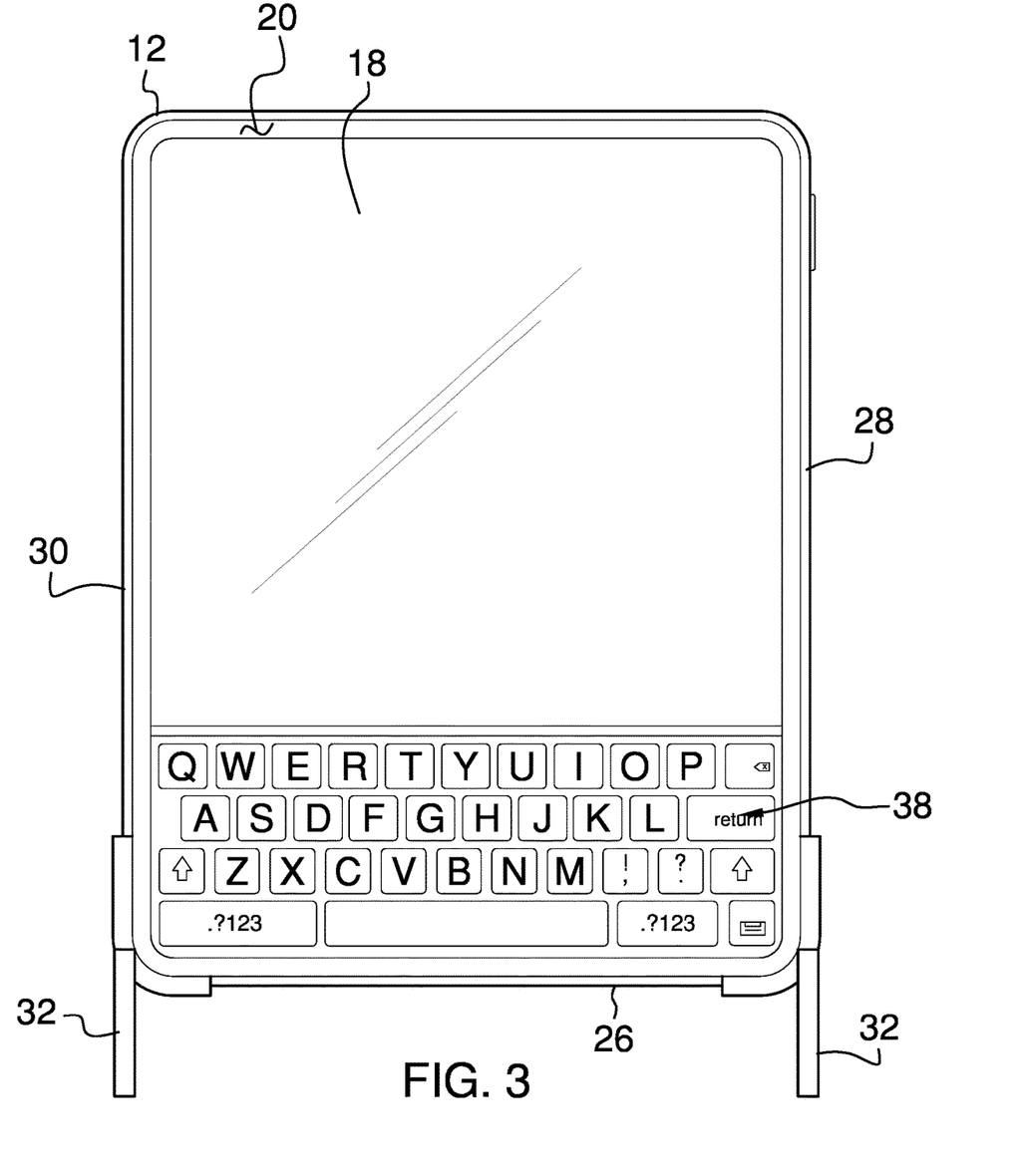
FIG. 3 is a back view of an embodiment of the disclosure.
Figure 4:
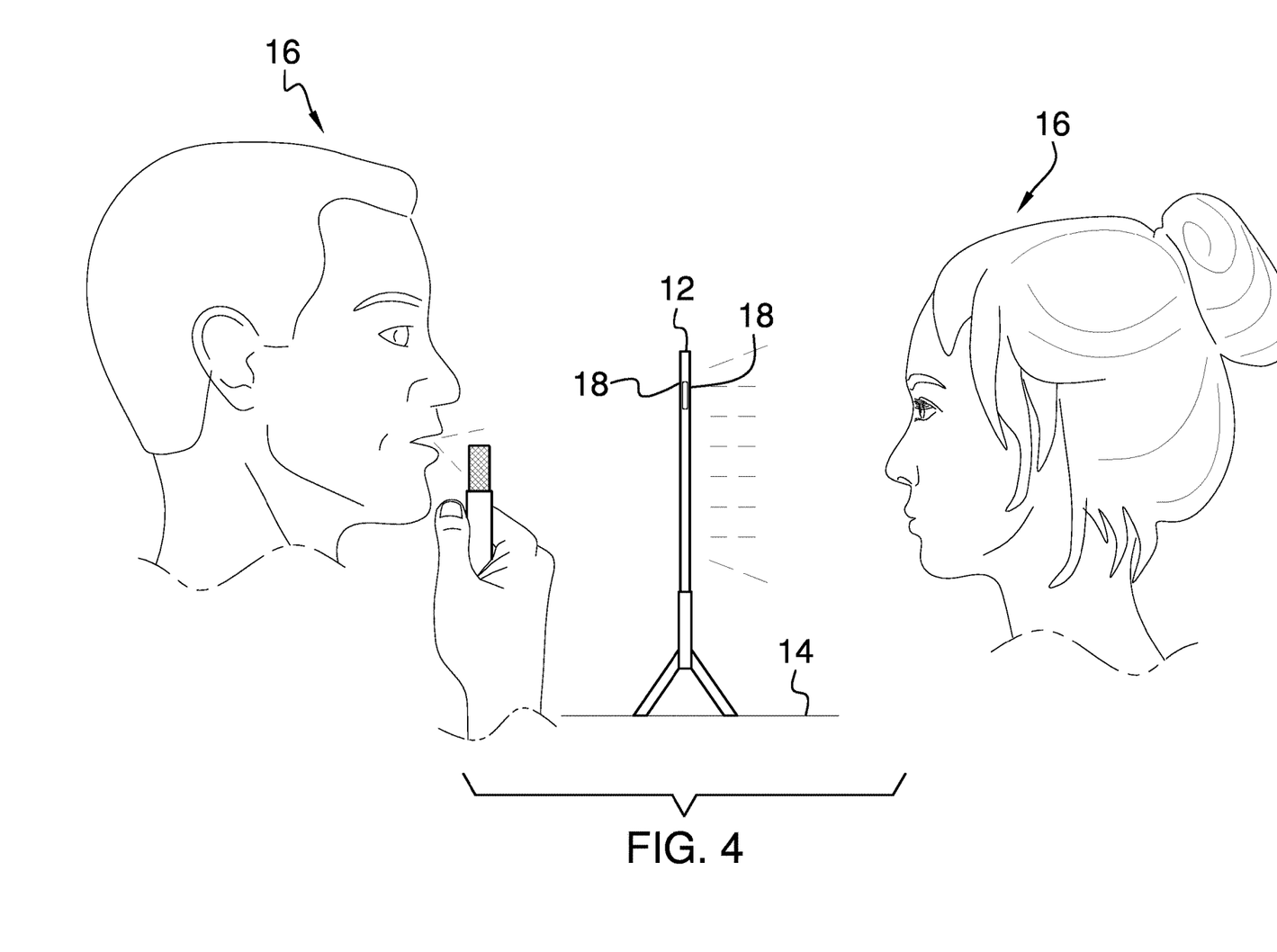
FIG. 4 is a perspective view of an embodiment of the disclosure.
Figure 5:
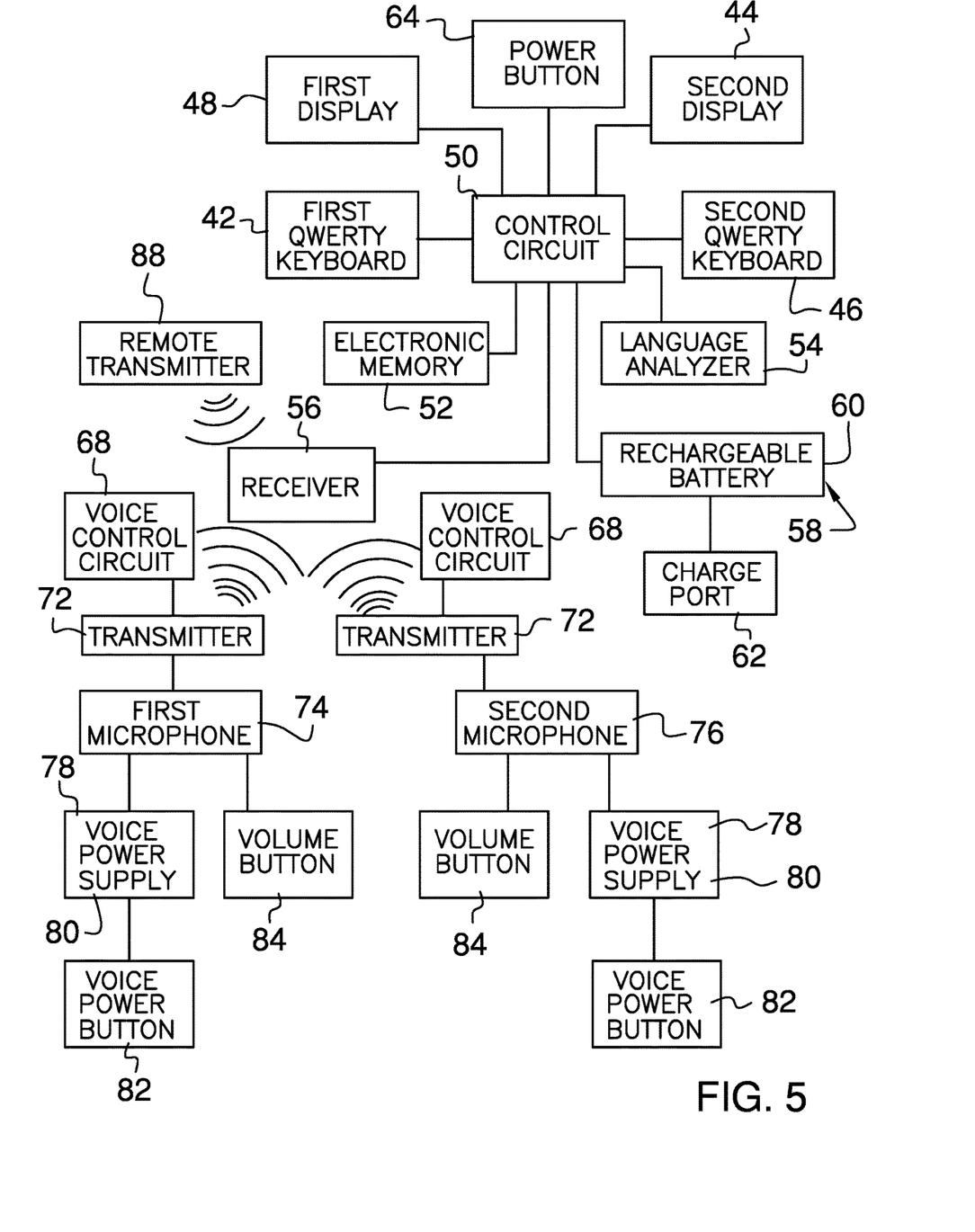
FIG. 5 is a schematic view of an embodiment of the disclosure.

A translation unit 40 is integrated into the display housing 12, and the translation unit 40 is in communication with each of the qwerty keyboards 38 and each of the displays 18. The translation unit 40 stores a database comprising a plurality of languages spoken around the world. The translation unit 40 translates a language input with a first one of qwerty keyboards 42 into a chosen language that is displayed on a second one of the displays 44. In this way the translation unit 40 facilitates a patient who speaks a first language to communicate with a caregiver that speaks a second language. The translation unit 40 translates language input with a second one of the qwerty keyboards 46 into a chosen language that is displayed on a first one of the displays 48. In this way the translation unit 40 facilitates the caregiver to communicate with the patient without the need for a translator. Thus, the caregiver and the patient can discuss sensitive medical information, for example, without the need to have a third party involved to translate between the patient and the caregiver. In this way the private information that is communicated by the patient is conveyed only to the caregiver.

The translation unit 40 includes a control circuit 50 that is integrated into the display housing 12. The control circuit 50 is electrically coupled to each of the displays 18 and the control circuit 50 is electrically coupled to each of the qwerty keyboards 38. The translation unit 40 includes an electronic memory 52 that is integrated into the display housing 12. The electronic memory 52 is electrically coupled to the control circuit 50 and the electronic memory 52 stores the database comprising the plurality of languages. The electronic memory 52 may comprise a solid state electronic memory of any conventional design, including but not being limited to, flash memory, random access memory or a hard disk drive.

A language analyzer 54 is provided and the language analyzer 54 is integrated into the display housing 12. The language analyzer 54 is electrically coupled to the control circuit 50 and the language analyzer 54 analyzes language input with the first qwerty keyboard 42. Moreover, the language analyzer 54 selects words in the electronic memory 52 that correspond to language input with the first qwerty keyboard 42. The second display 44 displays the words selected by the language analyzer 54. The language analyzer 54 analyzes language input with the second qwerty keyboard 46. Additionally, the language analyzer 54 selects words in the electronic memory 52 that correspond to language input with the second qwerty keyboard 46. The first display displays 18 the words selected by the language analyzer 54 with respect to the language input with the second qwerty keyboard 46.

A receiver 56 is integrated into the display housing 12 and the receiver 56 is electrically coupled to the control circuit 50. The receiver 56 may comprise a radio frequency receiver or the like. A power supply 58 is integrated into the display housing 12 and the power supply 58 is electrically coupled to the control circuit 50. The power supply 58 comprises a rechargeable battery 60 that is integrated into the display housing 12 and the rechargeable battery 60 is electrically coupled to the control circuit 50. The power supply 58 includes a charge port 62 that is recessed into the perimeter surface 24 of the display housing 12 to receive a charge cord. The charge port 62 is electrically coupled to the rechargeable battery 60 for charging the rechargeable battery 60. A power button 64 is movably integrated into the perimeter surface 24 of the display housing 12 and the power button 64 is electrically coupled to the control circuit 50 for turning the control circuit 50 on and off.

A pair of voice recorders 66 is provided and each of the voice recorders 66 is manipulated by a respective one of the caregiver and the patient. A pair of voice control circuits 68 is each integrated into a respective one of the voice recorders 66. Additionally, a pair of microphones 70 is each coupled to a respective one of the voice recorders 66 to record words spoken by a respective one of the caregiver and the patient. Each of the microphones 70 is electrically coupled to a respective one of the voice control circuits 68. A pair of transmitters 72 is each integrated into a respective one of the voice recorders 66 and each of the transmitters 72 is electrically coupled to a respective one of the voice control circuits 68. Additionally, each of the transmitters 72 is in wireless communication with the receiver 56. Each of the transmitters 72 may comprise a radio frequency transmitter or the like.

The language analyzer 54 analyzes words spoken into a first one of microphones 74 thereby facilitating the language analyzer 54 to select words in the electronic memory 52 that correspond to the words spoken into the first microphone 74. Moreover, the second display 44 displays 18 the words selected by the language analyzer 54 with respect to the words spoken into the first microphone 74. The language analyzer 54 analyzes words spoken into a second one of the microphones 76 thereby facilitating the language analyzer 54 to select words in the electronic memory 52 that correspond to the words spoken into the second microphone 76. Additionally, the first display displays 18 the words selected by the language analyzer 54 with respect to the words spoken into the second microphone 76. In this way the caregiver and the patient can verbally communication with each other instead of typing with the qwerty keyboards 38.

A pair of voice power supplies 78 is each integrated into a respective one of the voice recorders 66, each of the voice power supplies 78 is electrically coupled to a respective one of the voice control circuits 68 and each of the voice power supplies 78 comprises at least one battery 80. A pair of voice power buttons 82 is each movably integrated into a respective one of the voice recorders 66. Each of the voice power buttons 82 is electrically coupled to a respective one of the voice control circuits 68 for turning the respective voice control circuit 50 on and off.

A pair of volume buttons 84 is each movably integrated into a respective one of the voice recorders 66. Each of the volume buttons 84 is electrically coupled to a respective one of the voice control circuits 68. Each of the volume buttons 84 is actuatable in an increase condition or a decrease condition for either increasing or decreasing a sensitivity of a respective one of the microphones 70. A remote control 86 is provided and the remote control 86 is in remote communication with the translation unit 40 for controlling operational parameters of the translation unit 40, including but not being limited to, selecting a language spoken by the caregiver and a language spoken by the patient. The remote control 86 includes a remote transmitter 88 that is in wireless communication with the receiver 56. The remote control 86 includes a plurality of control buttons 90 for inputting control commands into the language analyzer 54.

In use, the display housing 12 is positioned on a table, for example, such that each of the first display 48 and the first qwerty keyboard 42 is visible to the caregiver and the second display 44 and the second qwerty keyboard 46 is visible to the patient. The caregiver employs the remote control 86 to program the language analyzer 54 to translate between the caregiver and the patient. The patient types with the second qwerty keyboard 46, the language analyzer 54 translates the patient's language into the caregiver's language and the translated language is displayed on the first display 48. In this way the caregiver can understand what the patient is typing, and the same applies when the caregiver is typing with the first qwerty keyboard 42. Each of the voice recorders 66 can be employed in lieu of the qwerty keyboards 38 to facilitate the caregiver and the patient to verbally communicate with each other. In this way the caregiver and the patient can communicate with each other without the need of a third party to act as a translator.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A two way communication assembly for facilitating verbal communication between a hearing or language impaired user and a caregiver, said assembly comprising:
   a display housing being positionable on a support surface wherein said display housing is configured to be visible to a pair of users, said display housing having a pair of displays each being integrated into opposite sides of said display housing wherein each of said displays is configured to be visible to a respective one of the users;
   a plurality of feet, each of said feet being coupled to said display housing, said plurality of feet supporting said display housing on a support surface having said display housing being vertically oriented wherein said display housing is configured to be visible to the caregiver and the patient;
   a pair of qwerty keyboards, each of said qwerty keyboards being integrated into opposite sides of said display housing wherein each of said qwerty keyboards is configured to be accessible to a respective one of the users thereby facilitating each of the users to type with a respective one of said qwerty keyboards, each of said qwerty keyboards being in communication with a respective one of said displays, each of said displays displaying indicia comprising words typed by said respective qwerty keyboard, each of said qwerty keyboards being positioned on a respective one of a front surface and a back surface of said display housing, each of said qwerty keyboards being positioned between a bottom side of a perimeter surface of said display housing and said respective display; and
   a translation unit being integrated into said display housing, said translation unit being in communication with each of said qwerty keyboards and each of said displays, said translation unit storing a database comprising a plurality of languages spoken around the world, said translation unit translating language input with a first one of qwerty keyboards into a chosen language that is displayed on a second one of said displays wherein said translation unit is configured to facilitate a patient who speaks a first language to communicate with a caregiver that speaks a second language, said translation unit translating language input with a second one of said qwerty keyboards into a chosen language that is displayed on a first one of said displays wherein said translation unit is configured to facilitate the caregiver to communicate with the patient.

2. The assembly according to claim 1, wherein:
   said display housing has said perimeter surface extending between said front surface and said back surface, each of said displays being positioned on a respective one of said front surface and said back surface, said perimeter surface having a first lateral side and a second lateral side; and
   each of said feet extends downwardly from said bottom side of said perimeter surface of said display housing, each of said feet being oriented at a substantially diagonal angle with a respective one of said front surface and said back surface of said display housing, each of said feet being positioned adjacent to a respective one of said first lateral side and said second lateral side of said perimeter surface of said display housing.

3. The assembly according to claim I. wherein said translation unit includes:

a control circuit being integrated into said display housing, said control circuit being electrically coupled to each of said displays, said control circuit being electrically coupled to each of said qwerty keyboards;

an electronic memory being integrated into said display housing, said electronic memory being electrically coupled to said control circuit, said electronic memory storing said database comprising the plurality of languages; and a language analyzer being integrated into said display housing, said language analyzer being electrically coupled to said control circuit, said language analyzer analyzing language input with said first qwerty keyboard thereby facilitating said language analyzer to select words in said electronic memory that correspond to language input with said first qwerty keyboard, said second display displaying the words selected by said language analyzer, said language analyzer analyzing language input with said second qwerty keyboard thereby facilitating said language analyzer to select words in said electronic memory that correspond to language input with said second qwerty keyboard, said first display displaying the words selected by said language analyzer with respect to the language input with said second qwerty keyboard.

4. The assembly according to claim 3, further comprising:

a receiver being integrated into said display housing, said receiver being electrically coupled to said control circuit;

a pair of voice recorders, each of said voice recorders being manipulated by a respective one of the caregiver and the patient;

a pair of voice control circuits, each of said voice control circuits being integrated into a respective one of said voice recorders;

a pair of microphones, each of said microphones being coupled to a respective one of said voice recorders wherein each of said microphones is configured to record words spoken by a respective one of the caregiver and the patient, each of said microphones being electrically coupled to a respective one of said voice control circuits; and a pair of transmitters, each of said transmitters being integrated into a respective one of said voice recorders, each of said transmitters being electrically coupled to a respective one of said voice control circuits, each of said transmitters being in wireless communication with said receiver, said language analyzer analyzing words spoken into a first one of microphones thereby facilitating said language analyzer to select words in said electronic memory that correspond to the words spoken into said first microphone, said second display displaying the words selected by said language analyzer with respect to the words spoken into said first microphone, said language analyzer analyzing words spoken into a second one of said microphones thereby facilitating said language analyzer to select words in said electronic memory that correspond to the words spoken into said second microphone, said first display displaying the words selected by said language analyzer with respect to the words spoken into said second microphone.

5. The assembly according to claim 3, further comprising:

a receiver being integrated into said display housing, said receiver being electrically coupled to said control circuit; and a remote control being in remote communication with said translation unit for controlling operational parameters of said translation unit including selecting a language spoken by the caregiver and a language spoken by the patient, said remote control including a remote transmitter being in wireless communication with said receiver, said remote control including a plurality of control buttons for inputting control commands into said language analyzer.

6. A two way communication assembly for facilitating verbal communication between a hearing or language impaired user and a caregiver, said assembly comprising:

a display housing being positionable on a support surface wherein said display housing is configured to be visible to a pair of users, said display housing having a pair of displays each being integrated into opposite sides of said display housing wherein each of said displays is configured to be visible to a respective one of the users, said display housing having a front surface, a back surface and a perimeter surface extending between said front surface and said back surface, each of said displays being positioned on a respective one of said front surface and said back surface, said perimeter surface having a bottom side, a first lateral side and a second lateral side;

a plurality of feet, each of said feet being coupled to said display housing, said plurality of feet supporting said display housing on a support surface having said display housing being vertically oriented wherein said display housing is configured to be visible to the caregiver and the patient, each of said feet extending downwardly from said bottom side of said perimeter surface of said display housing, each of said feet being oriented at a substantially diagonal angle with a respective one of said front surface and said back surface of said display housing, each of said feet being positioned adjacent. to a respective one of said first lateral side and said second lateral side of said perimeter surface of said display housing;

a pair of qwerty keyboards, each of said qwerty keyboards being integrated into opposite sides of said display housing wherein each of said qwerty keyboards is configured to be accessible to a respective one of the users thereby facilitating each of the users to type with a respective one of said qwerty keyboards, each of said qwerty keyboards being in communication with a respective one of said displays, each of said displays displaying indicia comprising words typed by said respective qwerty keyboard, each of said qwerty keyboards being positioned on a respective one of said front surface and said back surface of said display housing, each of said qwerty keyboards being positioned between said bottom side of said perimeter surface of said display housing and said respective display;

a translation unit being integrated into said display housing, said translation unit being in communication with each of said qwerty keyboards and each of said displays, said translation unit storing a database comprising a plurality of languages spoken around the world, said translation unit translating language input with a first one of qwerty keyboards into a chosen language that is displayed on a second one of said displays wherein said translation unit is configured to facilitate a patient who speaks a first language to communicate with a caregiver that speaks a second language, said translation unit translating language input with a second one of said qwerty keyboards into a chosen language that is displayed on a first one of said displays wherein said translation unit is configured to facilitate the caregiver to communicate with the patient, said translation unit, including:
- a control circuit being integrated into said display housing, said control circuit being electrically coupled to each of said displays, said control circuit being electrically coupled to each of said qwerty keyboards;
- an electronic memory being integrated into said display housing, said electronic memory being electrically coupled to said control circuit, said electronic memory storing said database comprising the plurality of languages; and
- a language analyzer being integrated into said display housing, said language analyzer being electrically coupled to said control circuit, said language analyzer analyzing language input with said first qwerty keyboard thereby facilitating said language analyzer to select words in said electronic memory that correspond to language input with said first qwerty keyboard, said second display displaying the words selected by said language analyzer, said language analyzer analyzing language input with said second qwerty keyboard thereby facilitating said language analyzer to select words in said electronic memory that correspond to language input with said second qwerty keyboard, said first display displaying the words selected by said language analyzer with respect to the language input with said second qwerty keyboard;

a receiver being integrated into said display housing, said receiver being electrically coupled to said control circuit;

a power supply being integrated into said display housing, said power supply being electrically coupled to said control circuit, said power supply comprising:
- a rechargeable battery being integrated into said display housing, said rechargeable battery being electrically coupled to said control circuit;
- a charge port being recessed into said perimeter side of said display housing wherein said charge port is configured to receive a charge cord, said charge port being electrically coupled to said rechargeable battery for charging said rechargeable battery; and
- a power button being movably integrated into said perimeter side of said display housing, said power button being electrically coupled to said control circuit for turning said control circuit on and off;

a pair of voice recorders, each of said voice recorders being manipulated by a respective one of the caregiver and the patient;

a pair of voice control circuits, each of said voice control circuits being integrated into a respective one of said voice recorders;

a pair of microphones, each of said microphones being coupled to a respective one of said voice recorders wherein each of said microphones is configured to record words spoken by a respective one of the caregiver and the patient., each of said microphones being electrically coupled to a respective one of said voice control circuits;

a pair of transmitters, each of said transmitters being integrated into a respective one of said voice recorders, each of said transmitters being electrically coupled to a respective one of said voice control circuits, each of said transmitters being in wireless communication with said receiver, said language analyzer analyzing words spoken into a first one of microphones thereby facilitating said language analyzer to select words in said electronic memory that correspond to the words spoken into said first microphone, said second display displaying the words selected by said language analyzer with respect to the words spoken into said first microphone, said language analyzer analyzing words spoken into a second one of said microphones thereby facilitating said language analyzer to select words in said electronic memory that correspond to the words spoken into said second microphone, said first display displaying the words selected by said language analyzer with respect to the words spoken into said second microphone;

a pair of voice power supplies, each of said voice power supplies being integrated into a respective one of said voice recorders, each of said voice power supplies being electrically coupled to a respective one of said voice control circuits, each of said voice power supplies comprising at least one battery;

a pair of voice power buttons, each of said voice power buttons being movably integrated into a respective one of said voice recorders, each of said voice power buttons being electrically coupled to a respective one of said voice control circuits for turning said respective voice control circuit on and off;

a pair of volume buttons, each of said volume buttons being movably integrated into a respective one of said voice recorders, each of said volume buttons being electrically coupled to a respective one of said voice control circuits, each of said volume buttons being actuatable in an increase condition or a decrease condition for either increasing or decreasing a sensitivity of a respective one of said microphones; and a remote control being in remote communication with said translation unit for controlling operational parameters of said translation unit including selecting a language spoken by the caregiver and a language spoken by the patient, said remote control including a remote transmitter being in wireless communication with said receiver, said remote control including a plurality of control buttons for inputting control commands into said language analyzer.

\* \* \* \* \*